June 9, 1964   F. GEIGER   3,136,239
VENTILATING SYSTEM FOR VEHICLES
Filed Dec. 15, 1960
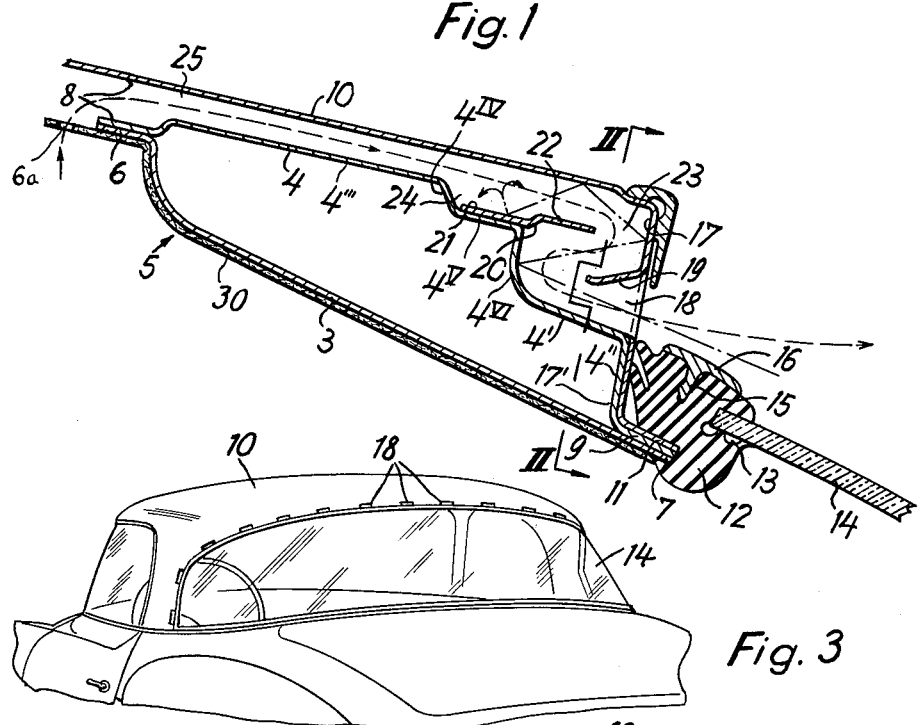
Fig. 1
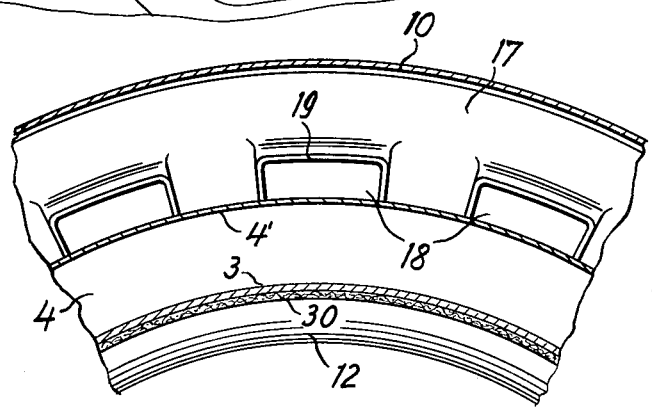
Fig. 3
Fig. 2
INVENTOR
FRIEDRICH GEIGER
BY
ATTORNEYS

3,136,239
VENTILATING SYSTEM FOR VEHICLES
Friedrich Geiger, Böblingen, Germany, assignor to Daimler-Benz Aktiengesellschaft, Stuttgart-Unterturkheim, Germany
Filed Dec. 15, 1960, Ser. No. 75,957
Claims priority, application Germany Dec. 17, 1959
5 Claims. (Cl. 98—2)

The present invention relates to a ventilating system for a vehicle and especially a passenger car, which is provided with a ventilating channel which is formed by the outer sheathing of the car top and the outer plate of the rear cross member of the top frame of the car, and from which the air escapes to the outside through apertures which are provided in the top sheathing.

The car ventilating systems of this type in which the space between two layers of the car top is utilized as an air channel are provided on their inlet or outlet sides or on both with air inlet or outlet apertures through which either rain may enter into the ventilating channel while the car is being driven or spray water while the car is being washed.

In order to prevent the entry of rain water into the ventilating channel or chamber, it has previously been proposed to provide closing flaps which may be operated by hand. These flaps which are intended to carry out several functions are also adjustable so that either the heated air coming from a heat exchanger is directed to the inside of the car or that the direction of flow of the ventilating air is reversed either at the point of its entry into the car or its discharge from the car. In vehicles in which the ventilating system is equipped with such flaps, there is no assurance that the vehicle will be constantly ventilated nor is it possible to prevent the entry of water into the ventilating channel or the interior of the vehicle while the flaps ore open.

Other ventilating systems for vehicles have been provided with labyrinthlike sheet-metal plates which are mounted behind the air inlet openings which are equipped with shut-off flaps, and which are intended to prevent the entry of rain or larger particles of other substances into the room to be ventilated. These plates are without any effect when the shutoff flaps are closed and they also do not prevent the entry of spray water which may enter through the rear air outlet openings, for example, when the car is being washed.

It is an object of the present invention to provide a ventilating system for vehicles and particularly automobiles which will overcome the above-mentioned disadvantages of previous ventilating systems. Generally speaking, this invention consists in providing the outer sheathing of a car top as well as the cross member of the top frame with air-deflecting plates or baffles which are adapted to reverse the direction of flow of the air current as well as of any water which might enter through the ventilating apertures.

By designing especially the rear part of the structure of a car top in accordance with the invention, it is now possible to ventilate the interior of a car constantly and at the same time to prevent any entry of water into the ventilating channel or into the interior of the car without requiring any additional adjustable shutoff elements.

These objects, features, and advantages of the present invention will become more clearly apparent from the following detailed description thereof, particularly when the same is read with reference to the accompanying drawings, in which—

FIGURE 1 shows a longitudinal section of the rear part of a car top; while

FIGURE 2 shows a cross section taken along line II—II of FIGURE 1.

FIGURE 3 shows the ventilator mounted over the rear window of a vehicle.

As illustrated in the drawings, the rear cross member 5 of the top frame of a car which consists of an inner plate 3 and a step-shaped outer plate 4, which are connected to each other at their outer edges by flanges 6, 7, 8, and 9, supports the outer sheathing 10 of the car top which is secured to cross member 5 by a flange 11. A sealing and securing member 12 of rubber is fitted by means of a longitudinal slot over the outwardly directed flanges 7, 9, and 11 which are welded together, and this rubber member 12 is provided with a further longitudinal slot 13 in which the rear window 14 is mounted, and with a third slot 15 for receiving a reinforcing strip 16 which also serves as an ornamental moulding.

A sheet-metal strip 17 which forms the rear edge of the car top and is integral with and bent almost at a right angle relative to the outer sheathing 10 is provided with substantially rectangular apertures 18 which are formed by cutting through the side and bottom edges thereof and by bending the material between these edges inwardly so as to form deflecting plates or baffles 19.

The step-shaped outer plate 4 of cross member 5 consists of step portions 4' to $4^V$ and carries a twice-bent metal strip 20, the two webs 21 and 22 of which extend substantially parallel to each other, as shown in FIGURE 1, and the free web 22 of which projects into a chamber 23 which is formed by deflecting plates 19 and the top sheathing 10. Web 21 together with a stepped part of the outer plate 4 forms a shallow recessed portion 24.

As indicated by the dotted-line arrow in FIGURE 1, the constant flow of air coming out of the interior of the car passes into a relatively shallow chamber or channel 25 which is formed by the outer plate 4 and the top sheathing 10. The air then continues to flow into chamber 23 and its direction is reversed therein about an angle of 180° once by web 22 of strip 20 and again by guide plates 19, whereupon it escapes to the outside through the apertures 18.

When the car is being washed, it can hardly be avoided that drops of water will enter through the ventilating apertures 18 into chamber 23. The velocity of these water drops will be decreased by the deflecting plates 19 and web 22 of the metal strip 20 to such an extent that the water will be caught within the shallow recess 24 and will not pass into the ventilating channel 25. The direction of the spray water is indicated in FIGURE 1 in dot-and-dash lines. Due to the downwardly inclined position of web 22 and by the possible additional provision of lateral discharge pipes, the spray water may then again flow off toward the outside.

The present invention is not limited to the particular embodiment thereof as illustrated in the drawings, but it may also be applied to ventilating systems, the air inlet openings of which are disposed above the windshield and which terminate in air outlet channels which are provided on the lateral sides of the car.

Having thus described my invention, what I claim is:
1. In a vehicle having a top panel, a frame supporting said top panel including a rear cross member spaced from said top panel to form a ventilation duct therebetween communicating with the interior of said vehicle and secured at one side portion thereof extending essentially transversely of said vehicle to said top panel adjacent the rear portion thereof, a downwardly extending rear wall portion integral with said top panel having a flanged end secured to said cross member adjacent the rear portion thereof, a portion of said cross member spaced from said rear wall portion and said top panel forming a chamber larger than said ventilation duct adjacent said rear wall portion and communicating with said ventilation duct, said rear wall portion having a plurality of apertures there- in forming air outlets for the passage of air through said duct and said chamber leading to the outside of the vehicle, a first deflecting plate secured within said chamber to said cross member and a plurality of second deflecting plates secured within said chamber and forming with said first deflecting member a means for reversing the direction of flow of the air passing through said chamber in the direction toward said apertures and for also reversing the direction of flow of any water which might enter said chamber from the outside through said apertures.

2. In a vehicle as defined in claim 3 in which said chamber is formed by the last step of said cross member adjacent said rear wall portion, and further including a rear window adjacent and below said cross member and sealing means connecting said window to said cross member at the connection between said cross member and the flanged portion of said rear wall portion for securing said window and sealing the same relative to said top.

3. In a vehicle as defined in claim 1, in which said second deflecting plates are integral with said top panel and extending from the upper edges of each of said apertures into said chamber at the end of the ventilating channel formed by said duct and said chamber, each of said plates being formed by bending inwardly the material cut out at three sides to form each of said apertures.

4. In a vehicle as defined in claim 1, in which said rear cross member of said frame has a plurality of steps therein adjacent said chamber, said first deflecting plates comprising a twice-bent metal strip having a pair of webs extending substantially parallel to each other and a connecting portion between and inclined relative to said webs, one of said webs being secured to said cross member at one of said steps thereof and together with said step forming a recess extending in the general direction of said cross member, the other web projecting into said chamber.

5. In a vehicle as defined in claim 1, wherein said top panel and said ventilation duct slope toward the rear of the vehicle, and in which said rear cross member has a plurality of steps formed in the upper surface thereof, said deflecting plates comprising plates secured to said top panel and extending from the upper edges of said apertures into said chamber at the end of said ventilating channel, and a twice-bent metal strip having a pair of webs extending substantially parallel to each other and a connecting portion between and inclined relative to said webs, one of said webs being secured to said cross member at one of said steps thereof and together with said step forming a recess extending in the general direction of said cross member, the other web projecting into said chamber above and spaced from said plates and in a direction substantially opposite to said plates, so that an air current flowing through the ventilation channel formed by said ventilation duct and chamber to said apertures is twice reversed in direction, first by said projecting web and then by said plates before it passes to the outside through said apertures, while water entering from the outside through said apertures must twice reverse its direction and also flow upwardly before entering said ventilation duct, said recess forming a collection tray for the water passing said deflecting plates and entering said ventilation ducts, and outlet means for passing the collected water from said recess to the outside.

References Cited in the file of this patent
UNITED STATES PATENTS

| | | |
|---|---|---|
| 1,539,534 | Ansell | May 26, 1925 |
| 1,861,286 | Royle | May 31, 1932 |
| 2,972,939 | Tomlinson | Feb. 28, 1961 |

FOREIGN PATENTS

| | | |
|---|---|---|
| 426,944 | Great Britain | Apr. 12, 1935 |